INVENTORS:
Gordon W. Nichols
Edward J. Radin

BY Edward H. Loremer

ATTORNEY

United States Patent Office

3,472,592
Patented Oct. 14, 1969

3,472,592
AUTOMATIC EXPOSURE SYSTEM
Gordon W. Nichols, Binghamton, and Edward J. Radin, Johnson City, N.Y., assignors to GAF Corporation, a corporation of Delaware
Filed Oct. 21, 1966, Ser. No. 588,543
Int. Cl. G03b 27/78
U.S. Cl. 355—83      4 Claims

ABSTRACT OF THE DISCLOSURE

An automatic exposure control for a photocopy machine. A light-sensitive photocell is responsive to light transmitted from the exposure light source to control the speed of the infeed sensitive paper feeding apparatus.

---

Figure 1:
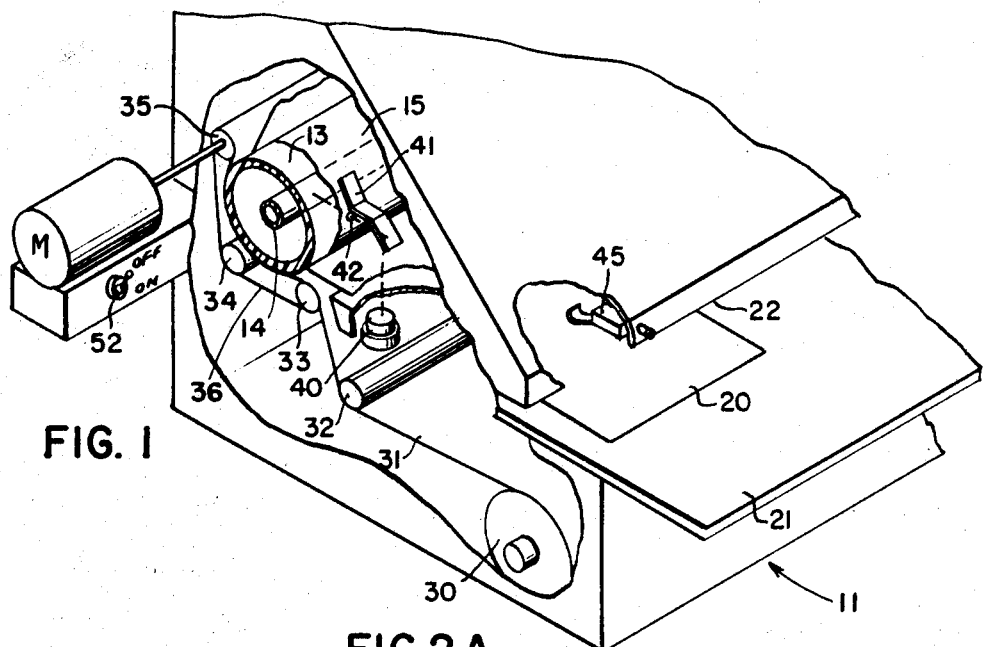

The present invention relates to photocopy machines and more particularly to photocopy machines having automatic exposure control devices to control the speed of feed of sensitized paper as it is passed over an exposure slot or exposure region.

In apparatus, in which light shines through an original to be copied, the speed of feed of the paper and the original past an exposure region can vary between wide limits. If the original is heavy bond paper, the passage of the original before the exposure slit or region must be slow; when it is a tracing on transparent or translucent paper, or tracing cloth, then the exposure may be quite short and the speed of passing the original past the light source can be rapid. In an actual apparatus, it has been found that the speed may vary from between two to sixty feet per minute, a speed range of 1:30. The speed of the drive motor which transports the original and the sensitized copy paper can readily be varied over this range by means such as silicon controlled rectifier speed controls and the like. Thus, heretofore the drive motor speed has been varied in proportion to the light transmissivity of the paper through which the exposure has to be made.

The length of exposure depends, however, not only on the correct characteristics of the original, but also on the brightness of the light of exposure. Absolute control of exposure, therefore, depending only on the paper itself, may result in unsatisfactory prints as the exposing lamp changes in brightness, for example, by aging. Upon installation of a new lamp, the exposure may be a good deal shorter than before and the speed of transport of the copy paper and the original should thus be increased.

It is desirable to avoid abrupt changes of speed of the motor, and thus of the feed, particularly when the copy paper is not supplied in cut sheet form, but unreeled from a supply roller, which may have appreciable inertia when the roll is full.

The present invention is concerned with a photocopy machine meeting the requirements of high speed of operation with the exposure being as commanded, in accordance with the automatic exposure control, without however straining the paper feed mechanism, and which would provide uniform prints of uniform quality with a given original.

Briefly, in accordance with the present invention, the photocopy machine has an automatic exposure control which includes light sensitive means such as a photovoltaic cell, a photoconductive cell, for example, of the CdS type, a phototransistor, or the like. A supply means of light sensitive copy paper is provided, and the copy paper together with an original is transported by a feeding arrangement, driven by an electric motor, along a predetermined path which includes an exposure region to expose the paper to a light source. A control circuit electrically interconnects the motor and the light sensitive cell to control the speed of the drive motor in accordance with light received thereby, the light sensitive cell is located in the machine to be responsive to light from the exposure lamp itself, so that the time of exposure, that is, the speed of feed of the motor, is varied in accordance with both the light transmissivity of the paper and the intensity of the light available for the exposure. Thus, both the characteristics of the original as well as the light emission characteristics of the exposing lamp are available as control parameters and thus proper exposures are obtainable at all times.

According to feature of the invention, the apparatus includes a light directing means, such as a mirror arrangement, to direct light from the exposing lamp through the original to the photocell.

When a tracing cloth original is fed to a photocopy machine of the type described, the exposure may be very short and thus the speed of the motor to transport the original before the slot may be appreciable. It is therefore desirable to provide for a gradual change in speed of the motor from the commanded speed to a preset idling speed, and this gradual change may be required where the photocell is located in advance of the exposing lamp, otherwise the speed change would adversely affect the exposure of the terminal end of the copy paper. In accordance with this feature of the invention, therefore, a switching means is provided in the control circuit to interrupt the control of the motor by the light sensitive cell after the exposure speed has been determined, and switch the motor control over to a time delay which has memorized the exposure speed and now controls the motor speed to gradually return to an idling speed. The switch is preferably located in the path of the original in such a manner that it controls the motor after the initial exposure speed has been determined. The time delay may be a condenser charged to a value proportional to the speed commanded by the photocell, so that upon switch-over the motor will be controlled to gradually reduce its speed in accordance with the wellknown time decay curve.

Figure 2A:
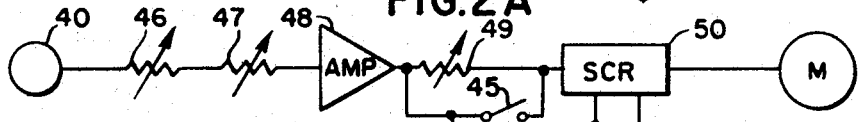
Figure 2B:
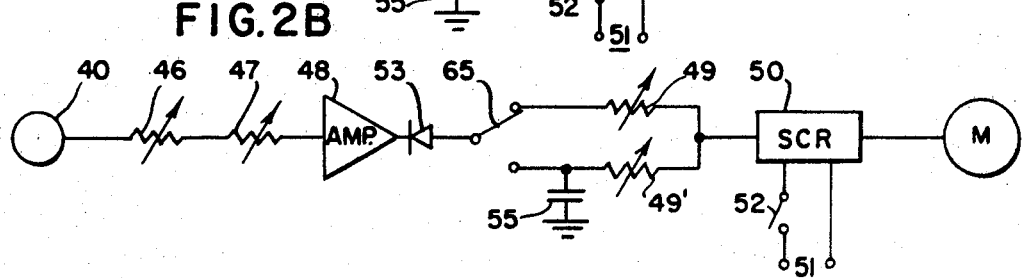
Figure 3:
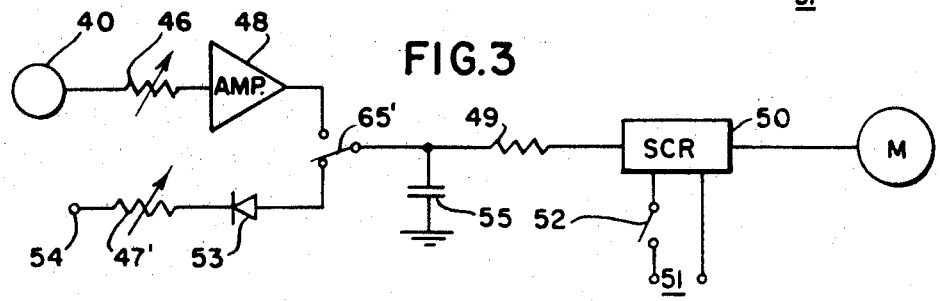

The structure, organization and operation of the invention will now be described more specifically in the following detailed description with reference to the accompanying drawings, in which:

FIG. 1 illustrates, partly in schematic form, and partly broken away, a photocopy machine in accordance with the present invention;

FIGS. 2A and 2B respectively illustrate alternative forms of electrical circuits useful in a photocopy machine of the present invention; and FIG. 3 is an illustration of still another alternative circuit.

Referring now to the drawings, wherein like reference characters designate like or corresponding parts throughout the several views, there is shown in FIG. 1: a casing 11 containing a rotatable transparent or translucent cylinder 13 made, for example, of glass. A light source, for example, a mercury lamp 14 which provides actinic radiation, is contained within the transparent cylinder 13, preferably coaxially. Lamp 14 is electrically connected to a current source by suitable leads not shown. An original 20, to be copied, is fed into the machine from a feeding apron 21 through a feed-in slit 22 formed in casing 11.

Below the feeding apron 21, a supply roll 30 of sensitized paper 31 is provided. Paper 31 runs over an idler roller 32, and above a belt 36 engaging cylinder 13 on one side and, on the other, running around three rollers 33, 34, 35, as best seen in FIG. 1. The original 20, and the sensitized paper 31 come together just in advance of the roller 33 and travel together over the transparent cylinder 13.

Any one of the rollers 33, 34, 35 may be driven by a motor M, to thereby move belt 36. Thus, for example, as schematically indicated in FIG. 1, motor M is connected to drive roller 35, in any conventional manner.

Exposure of the sensitized paper 31 by the lamp 14 prior to the feed of both the original 20 and the paper 31 is prevented by a shield 15.

The length of exposure, that is, the speed of motor M, is controlled by a light sensitive cell 40, located in a cut-out apron 21, or beneath a transparent region formed therein. Light from lamp 14 to the cell 40 is transmitted by a mirror 41 secured, for example, to shield 15 and having an opening 42 to permit light from the lamp 14 to shine on cell 40 as indicated by the dashed lines. The light, emanating from lamp 14, will thus shine through the original, and the response of cell 40 will be proportional to both the light transmissivity of the original as well as the strength or intensity of lamp 14.

Suitable cut-off means for the light sensitive paper 31 can be provided along the feed path thereof, for example, between rollers 32, 33, if provision is made to continue to feed the paper upon insertion of another original, for example, by pinch rollers bearing on the underside of roller 32 against paper 31, and a feed guide to bring the paper up over roller 33. Since such paper feed guides do not form a part of the present invention, they are not further illustrated.

A switch 45 is located in the feed path of the original 20, that is, it may be located in a cut-out apron 21, or above the apron, to be actuated to change its switching position upon being contacted by the leading edge of an original being inserted in feed slot 22.

FIGS. 2A and 2B respectively illustrate alternate circuits for use in the apparatus of FIG. 1. Light sensitive cell 40 is electrically connected to a manual adjusting resistor 46 which can be arranged to set the zero-response of the cell, and thus the idling speed of motor M. Another resistor, 47, and usually manually accessible to the operator, sets the light-dark contrast desired. The output of cell 40, attenuated by resistors 46, 47, is applied to an amplifier 48 which may be any well known transistor amplifier. The output of amplifier 48 is applied to a manually adjustable resistor 49 which directly affects the idling speed of the motor M, similar to the resistor 46. Resistor 49 is connected to a silicon controlled rectifier circuit 50, taking power from a line input 51 through an ON-OFF switch 52. Silicon controlled rectifier circuits, the firing time of which is itself controllable to control the speed of the motor M are well known; see for example, the "Silicon Controlled Rectifier Manual," General Electric Company, Rectifier Components Department, New York, with reference to the index "Motor Control." The control potential of the silicon controlled rectifier as illustrated in the aforementioned manual, rather than being obtained from a potentiometer as shown therein, in the present case is obtained from the output of resistor 49.

A time delay such as a condenser 55 placed in parallel with a resistor 49 memorizes the output signal of cell 40 and delays the release of this signal to thereby smoothly permit the return of the motor speed to the preset idle speed after the trailing edge of the original moves beyond the exposure region as will now be more fully described.

To make a copy, the operator first closes ON-OFF switch 52. Lamp 14 will light up through circuits connected to line 51, and not further illustrated; motor M will start. Light will shine on cell 40 and, there being no obstruction between the light source and the cell, the motor would turn at a high rate; however, resistor 49 will attenuate the output of amplifier 48, and thus will control the idle speed at which motor M will operate. When an original 20 is inserted in slit 22, the leading edge thereof will hit switch 45, closing the same. At this point resistor 49 is short circuited so that the speed of the motor M will be controlled entirely by the output of light sensitive cell 40, as regulated by the adjustment 46 and the manual, light-dark (contrast) adjustment 47. Condenser 55 will charge to a value which corresponds to the speed of the motor commanded by cell 40. When the trailing edge of the original 20 passes beyond switch 45, the switch will open, and the motor speed would immediately return to that controlled by the light source 14 shining directly on cell 40 as attenuated by resistor 49 but for condenser 55 (previously charged to the value corresponding to the maximum speed at which the motor was previously running) which now discharges through resistor 49, thus permitting motor M to return to its normal idling speed at a slow rate as governed by the well known time delay curve.

FIG. 2B shows a variation, in which switch 45 is replaced by a double-throw switch 65; the idle speed setting 49 remains as before; if slow charging of the condenser, and thus a more gradual acceleration of motor M is desired, a separate resistor 49' can be inserted in the line between the condenser 55 and the SCR unit 50. A diode 53 is preferably connected to the output of the amplifier to prevent discharge of the condenser 55; the polarity of the diode is determined by the polarity of the control potential which can readily be determined by those skilled in the art.

FIG. 3 shows another variation in which the idle speed of the motor is adjusted independently of the contrast; a resistor 47' is connected to a source of potential, derived, for example, from a voltage divider within the SCR circuit, and indicated at 54. Switch 65', again a double-throw switch, is shown with its solid line position before an original is inserted in the copy machine. In this embodiment, resistor 49 may be merely a small protective resistor. Diode 53 is, again, preferably used. When an original is inserted in the apparatus wired according to FIG. 3, switch 65' will change from that shown, solid line position to the other contact, so that control over motor M is directly from light-sensitive cell 40 over contrast adjustment 46, amplifier 48, switch 65', to SCR unit 50. Condenser 55 is being charged, as before, to a value representative of motor speed as commanded by light-sensitive cell 40. When the original passes beyond switch 65', it will switch over to the solid line position of FIG. 3 and condenser 55 can again discharge at the rate determined by resistor 49 and the internal impedance of the SCR network 50, thus controlling the motor M to decelerate slowly. Diode 53 again prevents discharge through source 54.

The present invention thus provides a photocopy machine in which the control of exposure time is directly dependent on the light transmissivity of an original, as well as on the intensity of the light source itself; since the control thus obtainable may vary between wide limits, means are provided to prevent rapid change of speed of the drive motor, and thus strain on the feed mechanism, the paper being fed, and the components associated therewith.

Under certain circumstances, the idle speed may be higher than the operating speed; in this case the condenser will, when inserted with the control for the SCR unit 50, reach a charge proportional to its lower speed. Upon switch-over to idling speed (change-over of switch 45, 65, or 65', respectively) the condenser will then gradually charge to the value corresponding to idle speed and again prevent abrupt speed changes of the motor.

It should be understood that the foregoing disclosure relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. Photocopy machine to make copies from an original on sensitized paper in which the speed of travel of said paper varies between wide limits comprising a motor; a speed control circuit for said motor including a first control means setting an idling speed and a second control means setting an operating speed; a condenser; and a switching means controlled by the position of said original in said machine, said switching means establishing a first circuit of said first control means to said motor upon sensing the absence of said original, and a second circuit of said second control means to said motor upon sensing the presence of said original, said condenser being connected in said second circuit to be charged to a value proportional to the motor speed upon presence of said original and being connected in said first circuit to discharge this charge and thus cause gradual change of speed from the operating speed to the idling speed by establishment of said switching means of said first circuit upon sensing the absence of said original.

2. Photocopy machine as recited in claim 1 including a light source for exposing said sensitized paper; and means directing a portion of said light to said original; said second control means including a light-sensitive cell arranged in the machine to be responsive to light from said light source as directed to said original whereby the response of said light-sensitive cell will be proportional to both the intensity of said light source and the light transmissivity of said original.

3. A photocopy machine to make copies from an original onto a light-sensitive copy paper having an automatic exposure control including light-sensitive means; a light-sensitive copy paper supply means; a light source to expose said copy paper; an electric motor for feeding said light-sensitive copy paper along a predetermined path including a region of exposure to said light source; switch means inserted in a control means; a manual motor speed control means; said switch means having a first position in which said manual motor speed control means is in circuit with said motor to set the idle speed thereof independent of light impinging on said light-sensitive means and a second position in which said motor speed control means is removed from control of said control means; and control means electrically interconnecting said motor and said light-sensitive means to control the speed of said motor in accordance with the light received by said light-sensitive means and to thus vary the time of exposure of said light-sensitive copy paper as it passes said region of exposure; said light-sensitive means being located in said machine to be responsive to light from said source so that the speed of said motor will be controlled to be responsive both to the characteristics of the original as well as the intensity of said light source and a time delay means in circuit with said control means; said time delay means being connected to memorize a value representative of the output of said lightsensitive means when said switch means is in said second position, said time delay means being connected to remain in circuit with said motor after changing of the switch means to said first position to provide for gradual return of said motor to idle speed.

4. Photocopy machine to make copies from an original onto a light-sensitive copy paper, having an automatic exposure control including light-sensitive means; a light-sensitive copy paper supply means; a light source to expose said copy paper; an electric motor for feeding said light-sensitive copy paper along a predetermined path including a region of exposure to said light source; control means electrically interconnecting said motor and said light-sensitive means to control the speed of said motor in accordance with the light received by said light-sensitive means and to thus vary the time of exposure of said light-sensitive copy paper as it passes said region of exposure; said light-sensitive means being located in said machine to be responsive to light from said source so that the speed of said motor will be controlled to be responsive both to the characteristics of the original as well as to the intensity of said light source; and switch means inserted in said control means, said switch means being actuated by the presence of said original in said machine to connect said light-sensitive means to said motor; a time delay means connected to memorize to a value proportional to the speed of said motor when said motor is under control of said light-sensitive means; said switch means being actuated by said original passing therebeyond through the machine to disconnect said light-sensitive means from said motor whereby said time delay means tends to maintain motor speed as controlled by said light-sensitive means and provide for gradual variation therefrom.

References Cited

UNITED STATES PATENTS

| | | | |
|---|---|---|---|
| 2,243,047 | 5/1941 | Foster et al. | 95—75 |
| 2,774,290 | 12/1956 | Mormann | 95—77.5 |

NORTON ANSHER, Primary Examiner

WAYNE A. SIVERTSON, Assistant Examiner

U.S. Cl. X.R.

355—104